US009998247B1

(12) United States Patent
Choudhury et al.

(10) Patent No.: US 9,998,247 B1
(45) Date of Patent: Jun. 12, 2018

(54) CONTROLLER-BASED NETWORK DEVICE TIMING SYNCHRONIZATION

(71) Applicant: Juniper Networks, Inc., Sunnyvale, CA (US)

(72) Inventors: Abhijit Kumar Choudhury, Cupertino, CA (US); Murthy Garikiparthi, Dublin, CA (US); DeviPrasad Natesan, Santa Clara, CA (US); James Michael Murphy, Alameda, CA (US); Meenakshi Sundaram Subramanian, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 483 days.

(21) Appl. No.: 14/586,507

(22) Filed: Dec. 30, 2014

(51) Int. Cl.
*H04J 3/06* (2006.01)
*H04L 12/911* (2013.01)
*H04L 12/24* (2006.01)
*H04L 12/751* (2013.01)

(52) U.S. Cl.
CPC .......... *H04J 3/0685* (2013.01); *H04J 3/0602* (2013.01); *H04L 41/085* (2013.01); *H04L 45/02* (2013.01); *H04L 47/828* (2013.01)

(58) Field of Classification Search
None
See application file for complete search history.

(56) References Cited

U.S. PATENT DOCUMENTS

| 8,018,880 | B2 | 9/2011 | Figueira et al. |
| 8,085,791 | B1 | 12/2011 | Aggarwal et al. |
| 8,259,718 | B2 | 9/2012 | Akahane et al. |
| 8,504,718 | B2 | 8/2013 | Wang et al. |
| 8,635,326 | B1 | 1/2014 | Chaganti et al. |
| 8,693,374 | B1 | 4/2014 | Murphy et al. |
| 8,700,801 | B2 | 4/2014 | Medved et al. |
| 8,711,855 | B1 | 4/2014 | Murphy et al. |
| 8,885,463 | B1 | 11/2014 | Medved et al. |
| 2003/0026268 | A1 | 2/2003 | Navas |
| 2005/0117576 | A1 | 6/2005 | McDysan et al. |
| 2005/0152286 | A1 | 7/2005 | Betts et al. |
| 2007/0286198 | A1 | 12/2007 | Muirhead et al. |

(Continued)

FOREIGN PATENT DOCUMENTS

EP    1653675 A1    5/2006

OTHER PUBLICATIONS

"IEEE Standard for a Precision Clock Synchronization Protocol for Networked Measurement and Control Systems," IEEE Instrumentation and Measurement Society, IEEE Std 1588-2008, Jul. 2008, 289 pp.

(Continued)

*Primary Examiner* — Tito Pham
(74) *Attorney, Agent, or Firm* — Shumaker & Sieffert, P.A.

(57) ABSTRACT

In one example, a network controller manages a network having many network devices. Network devices can receive the timing flow port role assignments from the network controller based on the controller's global view of the network topology. The controller can also calculate timing offsets to be applied to the network devices, based on timestamp information obtained by the network devices via exchanging time synchronization protocol messages, and the controller can update time clocks on all of the network devices within a single window of time, based on a timing offsets calculated in single iteration of calculations.

33 Claims, 7 Drawing Sheets

(56) References Cited

U.S. PATENT DOCUMENTS

| | | |
|---|---|---|
| 2008/0228943 A1 | 9/2008 | Balus et al. |
| 2008/0247406 A1 | 10/2008 | Figueira et al. |
| 2011/0235524 A1 | 9/2011 | North et al. |
| 2011/0235545 A1 | 9/2011 | Subramanian et al. |
| 2012/0320926 A1 | 12/2012 | Kamath et al. |
| 2013/0083782 A1 | 4/2013 | Murphy et al. |
| 2013/0103818 A1 | 4/2013 | Koponen et al. |
| 2013/0121164 A1 | 5/2013 | Shabtay et al. |
| 2015/0318941 A1* | 11/2015 | Zheng .................. H04J 3/0697 370/503 |

OTHER PUBLICATIONS

"Mobile Backhaul Using MPLS-TP based PTN," www.utstar.com, Solutions, retrieved from internet http://www.utstar.com/solutions-network-operators/mobile-backhaul on Oct. 28, 2014, 2 pp.

"OpenFlow 1.2: Open Flow Switch Specification , Version 1.2 (Wire Protocol 0x03)," The Open Networking Foundation, Dec. 5, 2011, 83 pp.

Atlas et al., "Interface to the Routing System Framework," draft-ward-irs-framework-00, Network Working Group, Internet-draft, Jul. 30, 2012, 22 pp.

Gredler et al., "Advertising Link-State Information in BGP," draft-gredler-bgp-to-01 , Inter-Domain Routing, Internet-Draft, Jul. 11, 2011, 24 pp.

Mizrahi et al., "ReversePTP: A Software Defined Networking Approach to Clock Synchronization," HotSDN '14, Aug. 2014, 2 pp.

Vasseur et al., "Path Computation Element (PCE) Communication Protocol (PCEP)," Network Working Group, Request for Comments 5440, Mar. 2009, 88 pp.

\* cited by examiner

CONTROLLER-BASED NETWORK DEVICE TIMING SYNCHRONIZATION

TECHNICAL FIELD

The disclosure relates to packet-based computer networks and, more particularly, to synchronizing network device clocks within computer networks.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. The destination device extracts the data from the packets and assembles the data into its original form. Intermediate devices (referred to as network devices or nodes) are interconnected so as to provide an infrastructure for forwarding the packets between computing devices. For example, computer networks may include routers, switches, gateways, firewalls and a variety of other devices.

In many networks, it is important for nodes within the network to have accurate current time information. For example, accurate time information (i.e., time of day) may be necessary for computing timing delays for communicating packets between network nodes. Accurate timing information regarding the transit time of packets may be important to assess network efficiency and to ensure quality of service and performance measures. As an example, transit-delayed packets may result in interrupted audio service in voice over Internet Protocol (VoIP) applications. To correctly assess the timing information, it is important for the current time on all the interconnected computing devices of the network to be accurately synchronized to a primary reference time. The primary reference time may be provided by a primary reference clock source device, such as a Global Positioning System (GPS).

In some examples, some networks use time synchronization protocols in which one or more nodes are configured as master nodes to determine the primary reference time and deliver that time to other nodes configured as time slave nodes. The time synchronization protocols may employ distributed algorithms that result in slow convergence due to the iterative nature of the algorithms. This may be problematic in networks with a large number of nodes.

SUMMARY

In general, this disclosure describes techniques for centrally controlled network time synchronization, using a network controller that manages a network having many network devices. Network devices can receive the timing flow port role assignments from the network controller based on the controller's global view of the network topology. The controller can also calculate timing offsets to be applied to the network devices, based on timestamp information obtained by the network devices via exchanging time synchronization protocol messages, and the controller can update time clocks on the network devices based on the timing offsets.

In this manner, the network controller can update the time clocks on all of the network devices within a single window of time, based on a single iteration of calculations, as opposed to updating a set of network devices, waiting for the network devices to adjust and the next set of network devices to send information based on the new adjustment. In this manner, the time clocks of all of the network devices in the network managed by the controller can be synchronized more quickly, e.g., in a matter of minutes rather than hours.

The techniques of this disclosure may provide one or more advantages. For example, the techniques of this disclosure can allow for fast and efficient convergence of clock synchronization in large networks. The techniques of this disclosure may also reduce or avoid the need to run certain protocols or algorithms within individual nodes of a network, such as Best Master Clock Algorithm (BMCA) or Ethernet Synchronization Messaging Channel (ESMC), for example. This can allow for use of simpler, lower cost devices in the network.

In one example, a method includes determining, by a network controller that manages a network of a plurality of network devices, timing flow roles for one or more ports of each of the plurality of network devices based on topology information for the network, wherein the timing flow roles indicate an orientation of the ports relative to a grand master clock in a timing flow associated with a time synchronization protocol, and outputting, by the network controller, a plurality of messages to one or more of the plurality of network devices, wherein each of the plurality of messages specifies settings information to assign the determined timing flow roles to one or more ports of the respective network device of the plurality of network devices. The method includes receiving, by the network controller and from each of the plurality of network devices, timestamp information obtained by the plurality of network devices exchanging time synchronization protocol messages according to a time synchronization protocol, determining, by the network controller and based on the received timestamp information, a respective clock offset relative to a reference time of the grand master clock for each of the plurality of network devices, and outputting, by the network controller, the respective clock offsets to update a respective timing clock maintained by each of the plurality of network devices.

In another example, a controller that manages a network of a plurality of network devices includes one or more databases configured to store topology information for the network, a time synchronization module configured to determine timing flow roles for one or more ports of each of the plurality of network devices based on the topology information for the network, and one or more network device protocol interfaces, wherein each of the network device protocol interfaces is configured to output a plurality of messages to one or more of the plurality of network devices, wherein each of the plurality of messages specifies settings information to assign the determined timing flow roles to one or more ports of the respective network device of the plurality of network devices. The one or more network device protocol interfaces is configured to receive from each of the plurality of network devices, timestamp information obtained by the plurality of network devices exchanging time synchronization protocol messages, wherein the time synchronization module is configured to determine, based on the timestamp information, a respective clock offset for each of the plurality of network devices, and wherein the one or more network device protocol interfaces is configured to output the respective clock offsets to update a respective timing clock of each of the plurality of network devices.

In another example aspect, a system includes a plurality of network devices, and a network controller that manages a network that includes the plurality of network devices, the network controller comprising one or more databases configured to store topology information for the network, a time synchronization module configured to determine timing flow roles for one or more ports of each of the plurality of network devices based on the topology information for the network wherein the timing flow roles indicate an orientation of the ports relative to a grand master clock in a timing flow associated with a time synchronization protocol, and one or more network device protocol interfaces, wherein each of the network device protocol interfaces is configured to output a plurality of messages to one or more of the plurality of network devices, wherein each of the plurality of messages specifies settings information to assign the determined timing flow roles to one or more ports of the respective network device of the plurality of network devices. A network device of the plurality of network devices includes an interface configured to receive, from the network controller, a message that specifies settings information to assign timing flow roles to one or more ports of the network device, wherein the timing flow roles indicate an orientation of the ports relative to a grand master clock in a timing flow associated with a time synchronization protocol, a time synchronization protocol module configured to set the ports with respective timing flow roles according to the settings information, and, responsive to receiving the message and by the network device, exchange time synchronization protocol messages with one or more neighboring network devices to obtain timestamp information, wherein the time synchronization protocol module is configured to send, to the network controller, the timestamp information obtained by exchanging the time synchronization protocol messages, wherein the time synchronization module of the network controller is configured to determine, based on the timestamp information, a respective clock offset for each of the plurality of network devices, and wherein the one or more network device protocol interfaces is configured to output the respective clock offsets to update a respective timing clock of each of the plurality of network devices.

In a further example aspect, a method includes receiving, by a network device, a message from a network controller specifying settings information to assign timing flow roles to one or more ports of the network device, wherein the timing flow roles indicate an orientation of the ports relative to a grand master clock in a timing flow associated with a time synchronization protocol, setting, by the network device, the ports with respective timing flow roles according to the settings information, and responsive to receiving the message and by the network device, exchanging time synchronization protocol messages with one or more neighboring network devices to obtain timestamp information. The method also includes sending, by the network device to the network controller, the timestamp information obtained by exchanging the time synchronization protocol messages, receiving, from the network controller, clock offset information relative to a reference time of the grand master clock, and responsive to receiving the offset information from the network controller, updating, based on the clock offset information, a timing clock maintained by the network device.

In yet another example aspect, a network device includes a physical interface to receive a message from a network controller specifying settings information to assign timing flow roles to one or more ports of the network device, wherein the timing flow roles indicate an orientation of the ports relative to a grand master clock in a timing flow associated with a time synchronization protocol, and a time synchronization protocol module configured to set the ports with respective timing flow roles according to the settings information, and, responsive to receiving the message, exchange time synchronization protocol messages with one or more neighboring network devices to obtain timestamp information. The network device also includes a controller communication module configured to send, to the network controller, the timestamp information obtained by exchanging the time synchronization protocol messages, and receive, from the network controller, clock offset information relative to a reference time of the grand master clock, wherein the time synchronization protocol module is configured to, responsive to receiving the offset information from the network controller, update, based on the clock offset information, a timing clock maintained by the network device.

In a further example aspect, a computer-readable storage medium includes instructions for causing a programmable processor of a network device to receive a message from a network controller specifying settings information to assign timing flow roles to one or more ports of the network device, wherein the timing flow roles indicate an orientation of the ports relative to a grand master clock in a timing flow associated with a time synchronization protocol, set the ports with respective timing flow roles according to the settings information, responsive to receiving the message and by the network device, exchange time synchronization protocol messages with one or more neighboring network devices to obtain timestamp information, send, by the network device to the network controller, the timestamp information obtained by exchanging the time synchronization protocol messages, receive, from the network controller, clock offset information relative to a reference time of the grand master clock, and responsive to receiving the offset information from the network controller, update, based on the clock offset information, a timing clock maintained by the network device.

In a further example, a method includes determining, by a network controller that manages a frequency-assisted timing network of a plurality of network devices, timing flow roles for one or more ports of each of the plurality of network devices based on topology information for the network, wherein the timing flow roles indicate an orientation of the ports relative to a grand master clock in a timing flow associated with a time synchronization protocol, wherein determining the timing flow roles comprises determining common timing flow roles for (i) a first time synchronization control protocol for determining a timing frequency and (ii) a second time synchronization control protocol for determining a timing phase. The method also includes outputting, by the network controller, a plurality of messages to one or more of the plurality of network devices, wherein each of the plurality of messages specifies settings information to assign the determined timing flow roles to one or more ports of the respective network device of the plurality of network devices, determining, by the network controller and based on timestamp information received from one of the plurality of network devices, a respective clock offset relative to a reference time of the grand master clock for each of the plurality of network devices, and outputting, by the network controller, the respective clock offsets to update a respective timing clock maintained by each of the plurality of network devices.

The details of one or more examples are set forth in the accompanying drawings and the description below. Other features, objects, and advantages will be apparent from the description and drawings, and from the claims.

DETAILED DESCRIPTION

Figure 1A:
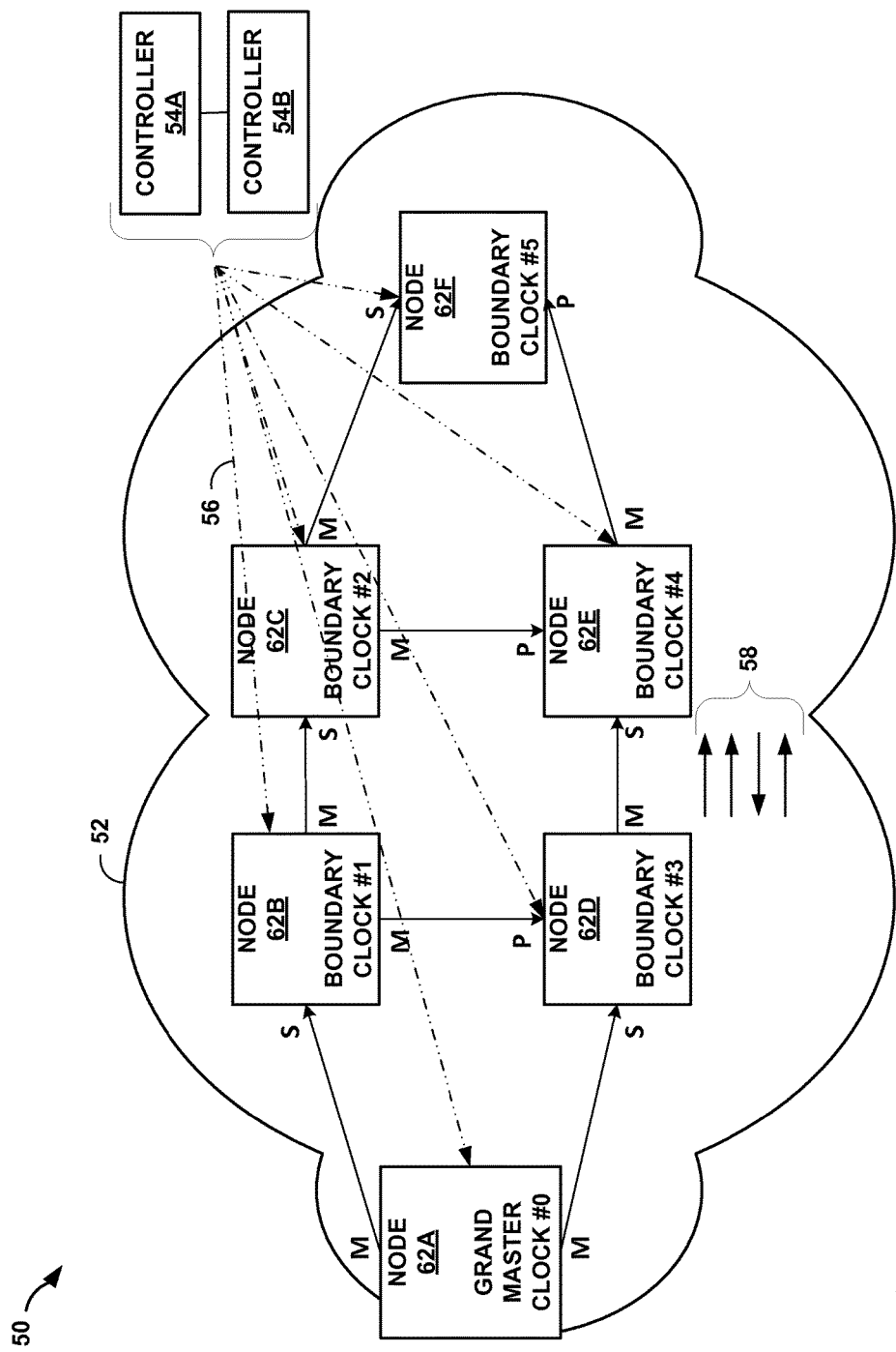
FIGS. 1A-1C are block diagrams illustrating an example system in which one or more central controllers and network devices are configured in accordance with the techniques of this disclosure.

FIG. 1A is a block diagram illustrating an example system 50 in which central controllers 54A-54B and network devices are configured in accordance with the techniques of this disclosure. System 50 includes redundant controllers 54A-54B ("controllers 54") configured to facilitate network device clock time synchronization of network devices in network 52. In the example of FIG. 1, controller 54A is a primary controller and controller 54B is a backup controller.

System 50 includes network 52 having nodes 62A-62F ("nodes 62"), which represent network devices, e.g., routers, switches, and other network devices. Although shown for purposes of example as having six nodes, network 52 may have a different number of nodes, including many more. In some examples, network 52 may be a service provider network. For example, network 52 may represent one or more networks owned and operated by a service provider (which is commonly a private entity) that offer one or more services for consumption by subscriber networks. In this context, network 52 is typically a layer two (L2) network. In some examples, network 52 may be a data center network.

Network 52 may provide a number of functions that rely on precise timing and synchronization of clock time across nodes 62 of network 52. As examples, data center networks and financial trading applications may need precise timing to produce accurate timestamps on trades or other operations. Network and system administrators often need accurate timing to visualize events in the network and decide cause-and-effect. Compliance and digital forensics may depend on transactions being accurately time-stamped. Mobile base stations may require accurate clock synchronization for mobile handoffs.

The Institute of Electrical and Electronics Engineers (IEEE) standard 1588-2008 describes Precision Time Protocol (PTP) Version 2 ("PTPv2"), a two-way message based protocol for synchronizing clocks throughout a computer network. See "IEEE Standard for a Precision Clock Synchronization Protocol for Networked Measurement and Control Systems," IEEE Std 1588-2008, the entire contents of which are incorporated by reference herein. PTPv2 synchronizes a local clock with a primary reference clock in a hierarchical master-slave architecture. Although described for purposes of example herein mainly with respect to nodes 62 using PTPv2, in other examples nodes 62 may use a different time synchronization protocol, e.g., Network Time Protocol (NTP), GPS, TTP, or serial real-time communication system (SERCOS), or other time synchronization protocol.

In the example of FIG. 1, node 62A is a network device that includes a clock designated as the grand master clock (#0). The grand master clock is the reference clock for network 52, i.e., the ultimate source of time for clock synchronization. Node 62B is a network device that includes a clock designated as boundary clock #1, node 62C is a network device that includes a clock designated as boundary clock #2, node 62D is a network device that includes a clock designated as boundary clock #3, node 62E is a network device that includes a clock designated as boundary clock #4, and node 62F is a network device that includes a clock designated as boundary clock #5. Boundary clocks, in IEEE 1588v2, are aggregation devices that act as a slave on one port and master for downstream ports. Transparent clocks (not shown in FIG. 1A) are neither master nor slave devices, and are normally switches that compensate for their own queuing delays, known as "residence time."

Network 52 may be, for example, an aggregation network, a service provider mobile backhaul network, a data center network, or other network. An example network architecture to which system 52 might be similar is described in U.S. Pat. No. 8,693,374, entitled CENTRALIZED CONTROL OF AN AGGREGATION NETWORK WITH A REDUCED CONTROL PLANE, issued Apr. 8, 2014; and U.S. Pat. No. 8,711,855, entitled TOPOLOGY DISCOVERY, CONTROL CHANNEL ESTABLISHMENT, AND DATAPATH PROVISIONING WITHIN AN AGGREGATION NETWORK WITH CENTRALIZED CONTROL, issued Apr. 29, 2014; the entire contents of each of which are incorporated by reference herein.

Controllers 54 allows for centralizing complex network control functions in system 50. In accordance with the techniques of this disclosure, controllers 54 centralizes aspects of network time synchronization control functions. Controller 54A has a "global" view of the topology of network 52. In some examples, controller 54A obtains its stored topology information from one or more of nodes 62 by executing one of a software defined networking (SDN) protocol or an interior routing protocol to receive the topology information from the nodes. In these and other examples, controller 54A may obtain topology information from a centralized topology database.

Controller 54A determines, based on its stored topology information, which individual ports of each of nodes 62 that participate in a timing flow should have master, slave, or passive timing flow role designations for time synchronization. The timing flow roles indicate an orientation of the ports relative to a grand master clock in a timing flow associated with a time synchronization protocol. Controller 54A determines port roles relative to the grand master clock, with master ports being upstream ports in the direction of the grand master relative to downstream slave ports. Upstream ports are not necessarily all master ports, but all master ports are upstream. As such, the port role assignments specify the direction in which time synchronization protocol messages are issued from node 62A having the grand master clock, downstream through the nodes from master ports to respective slave ports. Controller 54A sends messages 56 to each of nodes 62 configuring each of the nodes 62 with the master/slave/passive port designations. The assigned port role designations are represented in FIG. 1 by an "M" for master, "S" for slave, and "P" for passive. For example, controller 54A may send messages 56 via respective control channels between controller 54A and each of nodes 62 using a control protocol.

In some examples, controller 54A may use its topology information to compute primary and alternate paths for timing distribution. Controller 54A can initially configure nodes 62 with the port assignments for the primary timing distribution path. Then, if the primary path gets disrupted (e.g., due to the primary path becoming congested, having high jitter, or network events such as node or link failures), controller 54A can simply reconfigure the port designations on a few ports as needed, based on the computed alternate timing distribution path, to resume the timing distribution to the nodes 62 on the alternate path. In this way, controller 54A can update the timing distribution paths more quickly than is possible with a distributed BMCA process proceeding hop-by-hop through the nodes. By pre-computing and storing the primary and alternate paths and port designations, controller 54A can avoid having to run its calculations again to obtain new port designations at the time of detecting a network event that disrupts the timing distribution path.

In response to receiving the respective messages 56 from controller 54A, each of nodes 62 having ports designated as master is triggered to begin an exchange of time synchronization protocol packets between individual ports to collect timestamps and a flow is established between the grand master and the slave. That is, a downstream direction for flows of time synchronization protocol messages is established by the port role assignments received from controller 54A, so as to traverse the entire network outward from the grand master clock. In this manner, nodes 62 can receive the port role assignments from controller 54A without executing a control plane protocol for negotiating timing flow roles with neighboring network devices (e.g., BMCA).

As illustrated in FIG. 1, for example, node 62D having a port designated as master exchanges messages 58 with node 62E having a port designated as slave. That is, the master port initiates a sequence of messages 58 to be exchanged for determining the timing offset of the timing clock of the slave port's device relative to the timing clock of the master port's device. In some examples, messages 58 are PTPv2 messages, as described in further detail below. In the absence of the techniques of this disclosure, only when the time is set for a node having a given master port can the clock then be determined and set for the node having the respective slave port, and such determination is based on the time offset of the slave from the master, and such timing offset is computed based on the delay from the master to the slave. In this way, in conventional operation the clock determination and configuration for the network logically propagates outward from the grand master.

Figure 1B:
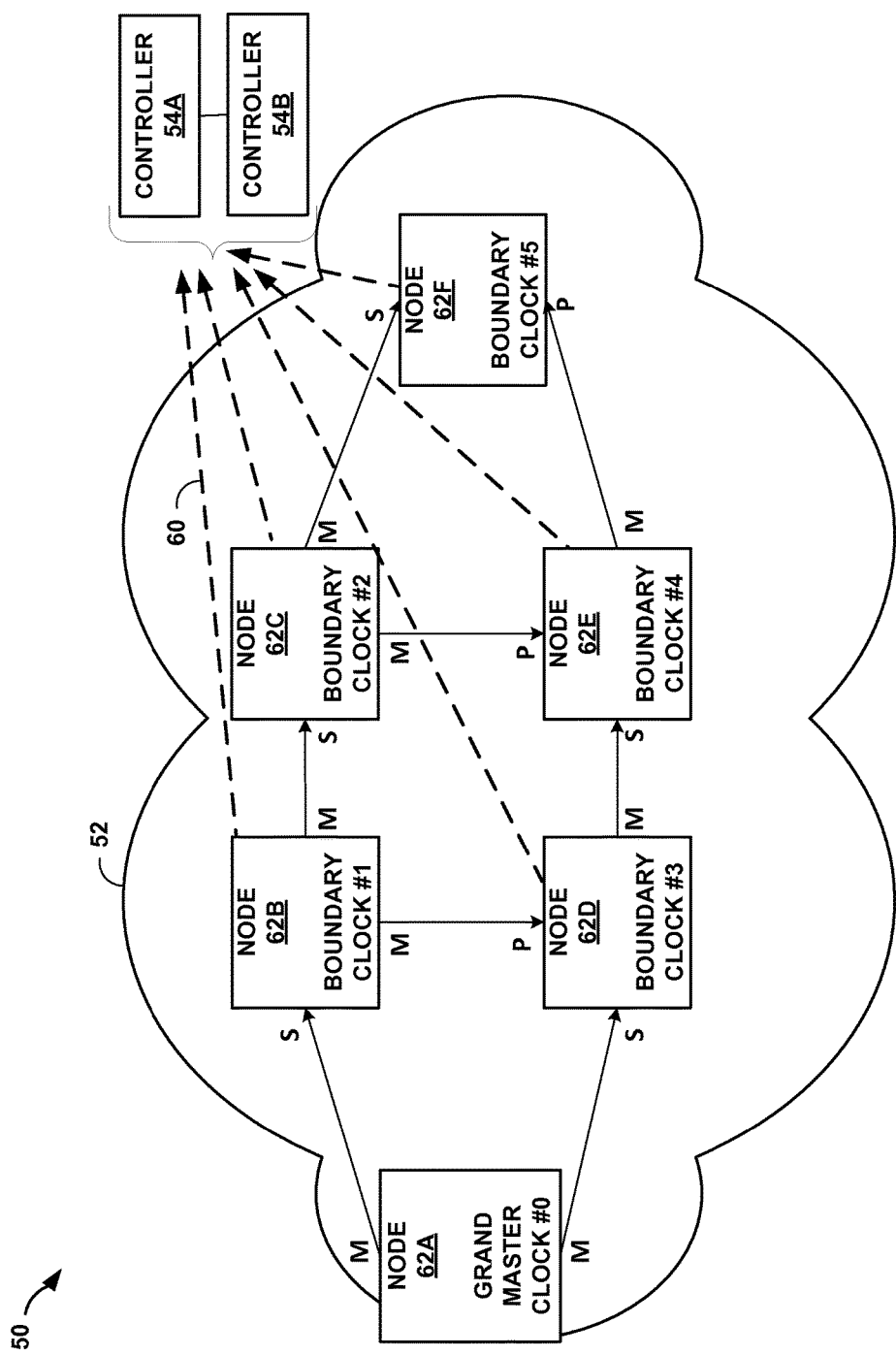

FIG. 1B is a block diagram illustrating the example system of FIG. 1A at a third time. In some examples, nodes 62 are configured such that after the nodes have completed the time synchronization protocol message exchange and obtained the timestamps needed to calculate the offsets for clock synchronization, each of nodes 62 sends a respective message 60 to controller 54A that specifies the timestamps. For example, nodes 62 may send messages 60 via respective control channels established between nodes 62B-62F and controller 54A. Controller 54A receives the message and stores the timestamps, and computes the offsets for the slave clocks based on the received timestamps.

In some examples, nodes 62B-62F are configured to forward copies of one or more of the received time synchronization protocol messages to controller 54A, from which controller 54A determines and stores the timestamps, and computes the offsets for the slave clocks based on the received messages. In either case, in some examples node 62A may not send timestamps to controller 54A, because node 62A has the grand master clock and does not need any offset computation.

Figure 1C:
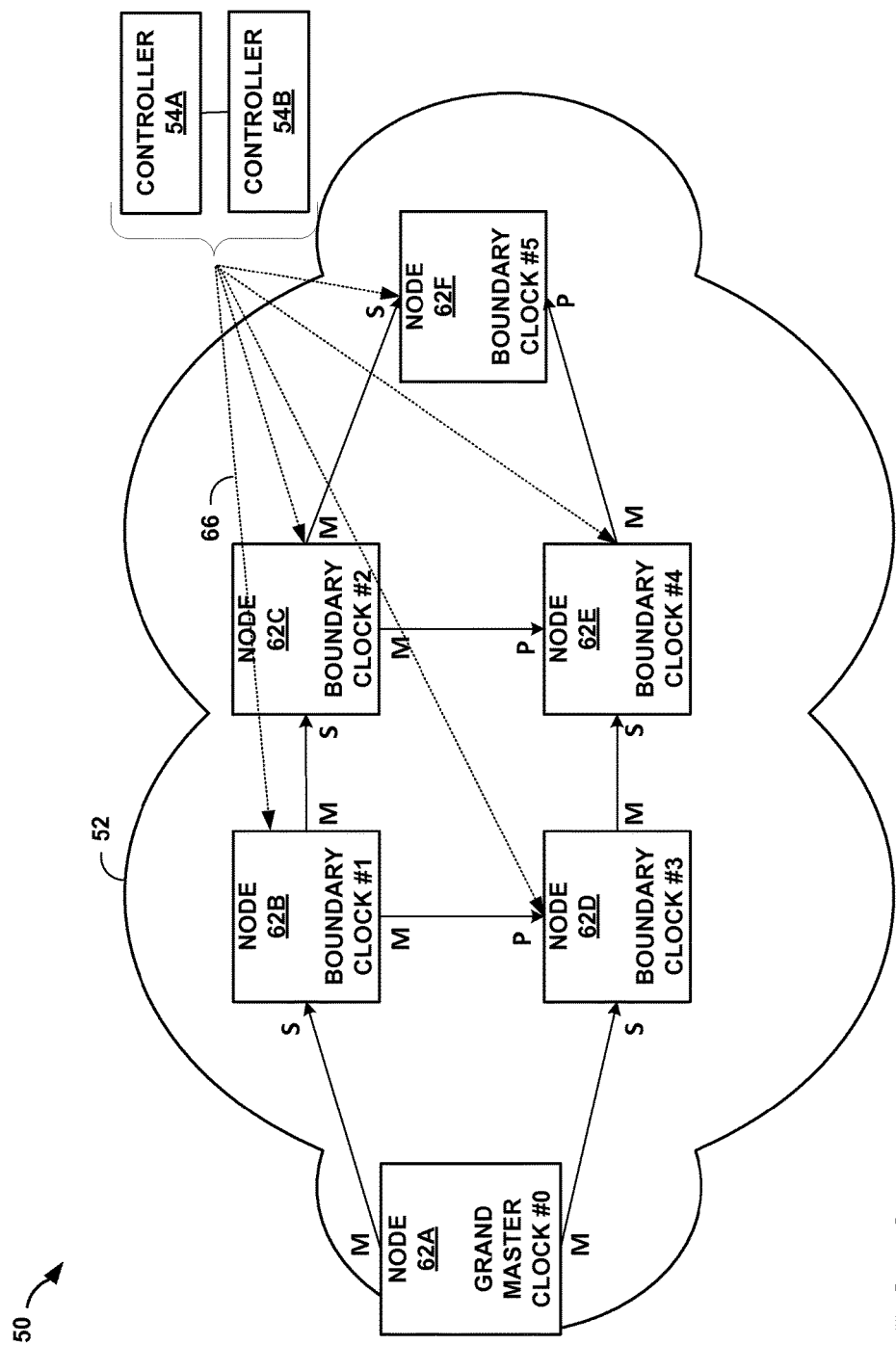

FIG. 1C is a block diagram illustrating the example system of FIG. 1A at a third time. Controller 54A computes the offsets for the slave clocks based on the timestamps that controller 54A obtained from the messages received from nodes 62B-62F. For example, Controller 54A can compute the clock time offset from each respective one of nodes 62B-62F having a slave port relative to the clock time of its neighboring node having a master port, based on the timestamps obtained from the respective node. When controller 54A has computed the offset of the first node over from the node having the grand master clock (e.g., node 62B being the first node), controller 54A now has the time value for the grand master clock of node 62A. Using this, controller 54A can adjust all of the times of the other nodes 62C-62F at once, such as by adding the appropriate offset values together. In this way, controller 54A does not need to wait for offset calculations to proceed level by level through network 52. Instead, controller 54A can instruct the nodes 62 to adjust their clocks based on a single round of computations.

As shown in FIG. 1C, controller 54A configures the nodes based on the computed offsets, e.g., by sending messages 66 to each of nodes 62B-62F, e.g., via respective control channels between controller 54A and nodes 62B-62F. Messages 66 may, in some examples, include data indicative of the time offset amount by which the respective node should adjust its clock. Controller 54A can perform a single round of calculations and update time clocks on nodes 62B-62F based on the results. In this manner, controller 54A can update time clocks on all of nodes 62B-62F within a single window of time, based on a single iteration of calculations, as opposed to updating a set of nodes, waiting for the nodes to adjust and the next set of nodes to send information based on the new adjustment. Controller 54A can enable time synchronization more quickly and efficiently than a distributed, non-controller-based system in which each level of nodes synchronizes to their master clocks, and then the next level of nodes adjusts to the updated master clocks, and so on. Controller 54A can either wait for its offset calculations to finish for all nodes and then update nodes 62, or update the nodes 62 as the calculation proceeds. In this manner, the time clocks of all of nodes 62 throughout network 52 can be synchronized more quickly, e.g., in a matter of minutes rather than hours.

In some cases, even if controller 54A waits to update nodes 62 until finishing offset calculations for all nodes, there may be timestamps being sent to controller 54A that are carrying results based on the previous clock times at the various nodes 62. This may be addressed in various ways. In some examples, controller 54A maintains a generation number during a given round of offset computations, and controller 54A includes the generation number used for the offset computations in the messages 62 providing the time offset information. The network devices would update their clocks and their record of the current generation number, and include it in the timestamp messages 60 subsequently sent back to controller 54A. Controller 54A may identify the generation number in a received message 60 that includes timestamps and use the generation number to determine which round of calculation is being used. That is, controller 54A can compare the generation number on the timestamp messages 60 coming in, and only include the timestamps with generation numbers equal to its current generation number to do its computation. Then controller 54A increases the generation number and the process iterates. In other examples, instead of using generation numbers, controller 54A may simply low-pass filter large variations in times so large positive or negative values are not used. For example, the controller can exclude from a clock offset computation any received timestamp information having time variations greater than a threshold amount of variation.

Messages 56, 60, and 66 of FIGS. 1A-1C may be control protocol messages sent via respective control channels between the respective nodes 62 and controller 54. For example, the control protocol messages may conform to a cloud control protocol as described in U.S. Pat. No. 8,693, 374, entitled CENTRALIZED CONTROL OF AN AGGREGATION NETWORK WITH A REDUCED CONTROL PLANE, issued Apr. 8, 2014.

If some of nodes 62 in network 52 are not capable of participating in communication with controller 54A in accordance with the techniques described herein, these nodes can continue to operate using all or part of a standard timing synchronization mechanism, such as IEEE 1588v2. Controller 54A can use a command line interface (CLI) or other means to label the port configuration on a non-participating node. The non-participating node exchanges PTP packets with the neighboring node on its port designated "slave" and syncs to the master clock timestamps arriving on that port. Once its clock is updated to that of the master, the non-participating node then sends out PTP packets to its neighbors on ports marked "master". In this manner, the techniques of this disclosure can be applied even in networks having a mix of capabilities in nodes 62.

When network 52 is a stable network, the process depicted in FIGS. 1A-1C may repeat periodically.

For example, the controller may determine whether a computed clock offset relative to the reference time of the grand master clock is greater than a threshold value, and only output the clock offsets when the computed clock offset is greater than the threshold value. In some examples, the controller may compute and output clock offsets periodically after a configured fixed interval of time.

Network 52 may achieve clock synchronization sooner after a network event occurs, e.g., the Grand Master clock changes or congestion increases on a path. In some cases, controller 54A may initiate the process in response to detecting a network event, or when network 52 is undergoing some transition, in which case the time synchronization process may occur more frequently and on an as-needed basis, in addition to regularly scheduled synchronizations. Depending on the network traffic load, with-in two to three window period, entire network right from the Grandmaster to the slave can be quickly synchronized.

Using the technique outlined in this disclosure, nodes 62 need not assign the ports by a process of dynamic negotiation with other network devices (e.g., using a Best Master Clock Algorithm (BMCA)), but rather can receive the port role assignments from controller 54A based on the controller's global view of the network topology. In this manner, controller 54A can assign the port roles for all the nodes 62 in the network 52 generally at the same time, without waiting for an algorithm to proceed through the network 52, device by device.

In addition, the timing offset from the grand master clock for ports that are multiple hops away from the grand master clock (e.g., nodes 62C, 62E, and 62F) can be computed simultaneously by controller 54A, drastically reducing the overall clock synchronization time. This may provide a faster and more efficient time synchronization process than a distributed, non-controller-based system in which timing adjustments proceed hop-by-hop through the network to adjust the clock of each level in the hierarchy.

In addition, controller 54A is able to see the congestion on paths based on the timestamp information controller 54A receives, and controller 54A can reassign the clock distribution paths if needed, e.g., assigning updated master-slave-passive port designations where suitable. As described, controller 54A may pre-compute alternate paths based on its topology information, so all controller 54A needs to do upon identifying congestion, link or node failure, etc. in network paths is re-label the ports of one or more of nodes 62 based on the alternate paths.

The techniques of this disclosure require minimal control plane software resident in the nodes, which means that nodes 62 can be less complex.

Another benefit can be that in frequency assisted timing networks, where Synchronous Ethernet (Sync-E) is used with IEEE 1588 (PTPv2), controller 54A can ensure that Sync-E and PTPv2select the same path to avoid timing loops. ESMC message processing is also not needed. That is, in frequency assisted (Sync-E with 1588) timing networks, each node relies on Sync-E for frequency and 1588 PTP messages for phase. Essentially, there are typically two control protocols (ESMC for Sync-E and BMCA for 1588) trying to set up the paths for Sync-E and 1588 independently. This lack of co-ordination can lead to situations in which Sync-E and 1588 get selected from different directions. Using manual configuration to address this issue does not scale well with complex networks. However, controller 54A can ensure Sync-E and 1588 select the same path to avoid timing loops. ESMC message processing is also not needed in this case, as controller 54A can assign the Master-Slave hierarchy. Thus, in hybrid SyncE-1588 timing networks, the ability to co-ordinate 1588v2 control with SyncE at controller 54A can yield a more efficient overall timing distribution solution.

In one example, assume a node 62 that has a port designated master gets disconnected from the network for a long time, and wants to rejoin. Meanwhile, the remaining nodes 62 have been operating with the previous information. In such a situation, applying a huge compensation in one step may destabilize the network. A better approach would be to apply the required compensation to the downstream nodes in a few steps.

Timing solutions also should be highly available. In the example of FIGS. 1A-1C, controllers 54A-54B provide a redundant controller system with a control plane that is constantly monitoring the state of links between nodes 62. The master controller 54A synchronizes state actively with the backup controller 54B and then in case of failure of the master controller, the backup controller 54B takes over right away without loss of any information. Also, the control protocol identifies link outages within milli-seconds and automatically recomputes and plumbs alternate paths to the controller. Consequently, the system is designed from the ground up to be highly available and carrier-grade. While the control plane is coming up (in milliseconds), the timing operation at the nodes 62, in which adjustments work in the order of seconds, continues to operate, and so the flap in the control plane is essentially invisible to the timing operation.

Figure 2:
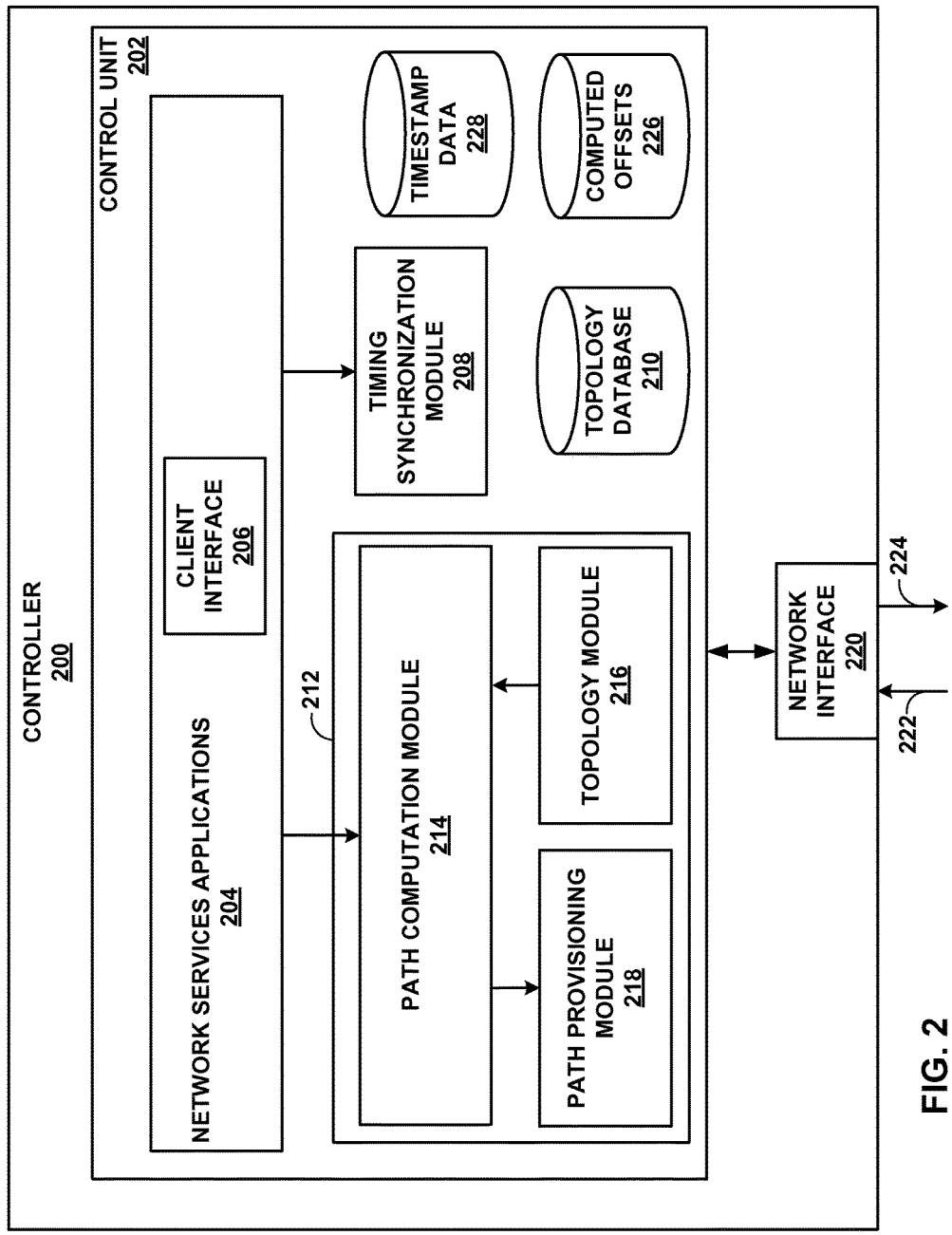
FIG. 2 is a block diagram illustrating an example central controller in accordance with the techniques of this disclosure.

FIG. 2 is a block diagram illustrating an example controller 200 configured to operate in accordance with one or more of the techniques described herein. Controller 200 may represent a server, a network controller, or other network management unit, that manages a network of one or more network devices. For instance, controller 200 may represent an example instance of one or more of controllers 54 as shown in FIGS. 1A-1C.

In the example of FIG. 2, controller 200 includes a control unit 202 coupled to a network interface 220 to exchange packets with other network devices by inbound link 222 and outbound link 224. Control unit 202 may include one or more processors (not shown in FIG. 2) that execute software instructions, such as those used to define a software or computer program, stored to a computer-readable storage medium (not shown in FIG. 2), such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively or additionally, control unit 202 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 202 provides an operating environment for network services applications 204, timing synchronization module 208, path computation module 214, topology module 216, path provisioning module 218, and, optionally, other control functions (not shown). In one example, these modules may be implemented as one or more processes executing on one or more virtual machines of one or more servers. That is, while generally illustrated and described as executing on a single controller 200, aspects of these modules may be delegated to other computing devices.

Network services applications 204, in the example of FIG. 2, represent one or more processes that provide services to clients of a network that includes and/or is managed by controller 200. Network services applications 204 may, for example, provide Voice-over-IP (VoIP) services, Video-on-Demand (VOD) services, bulk transport services, walled/open garden services, IP Mobility Subsystem (IMS) services or other mobility services, and/or Internet services to clients of the managed network. Each of network services applications 204 may include client interface 206 by which one or more client applications request services. Client interface 206 may represent a command line interface (CLI) or graphical user interface (GUI), for instance. Client interface 206 may also, or alternatively, provide an application programming interface (API) such as a web service to client applications.

In some examples, network services applications 204 may require support, such as node management, session management, policy enforcement, and/or other support. Path computation element 212, which includes modules 214, 216, and 218, may provide at least some such functionality. That is, in general, path computation element 212 may enable controller 200 to create, modify, and/or maintain the structure of the managed network. For instance, path computation element 212 may provide paths for network services applications 204. Network services applications 204 may issue path requests to path computation element 212 to request paths in a path computation domain controlled by controller 200. In general, an example path request may include a required bandwidth or other constraint and two endpoints representing network devices that communicate over the path computation domain managed by controller 200. Path requests may further specify time/date during which paths must be operational and Class of Service (CoS) parameters (e.g., bandwidth required per class for certain paths).

Path computation element 212 can accept path requests from network services applications 204 to establish paths between the endpoints over the path computation domain. Paths may be requested for different times and dates and with disparate bandwidth requirements. In some examples, path computation element 212 may reconcile path requests from network services applications 204 to multiplex requested paths onto the path computation domain based on requested path parameters and anticipated network resource availability.

To intelligently compute and establish paths through the path computation domain, path computation element 212 includes topology module 216, which may receive topology information that describes available resources of the path computation domain, including network devices, interfaces thereof, and interconnecting communication links. In other words, topology module 216 may provide an interface by which controller 200 obtains topology information about the managed network, e.g., network 52 (FIG. 1). In this manner, controller 20 obtains a comprehensive view of the topology of the managed network.

In some examples, topology module 216 may receive topology information from network devices in the network. For instance, in one example in which controller 200 represents network controller 54A of FIG. 1, topology module 216 may obtain topology information from one or more of nodes 62. In other examples, topology module 216 may receive the topology information from a centralized topology database. In a further example, topology module 216 may execute an interior routing protocol to receive the topology information. Topology module 216 can store the topology information to topology database 210.

Topology module 216 may communicate with a topology server, such as a routing protocol route reflector, to receive topology information for a network layer of the network. Topology module 216 may include a routing protocol process that executes a routing protocol to receive routing protocol advertisements, such as Open Shortest Path First (OSPF) or Intermediate System-to-Intermediate System (IS-IS) link state advertisements (LSAs) or Border Gateway Protocol (BGP) UPDATE messages. Topology module 216 may in some instances be a passive listener that neither forwards nor originates routing protocol advertisements. In some instances, topology module 216 may alternatively, or additionally, execute a topology discovery mechanism such as an interface for an Application-Layer Traffic Optimization (ALTO) service. Topology module 216 may therefore receive a digest of topology information collected by a topology server, e.g., an ALTO server, rather than executing a routing protocol to receive routing protocol advertisements directly.

In some examples, topology module 216 receives topology information that includes traffic engineering (TE) information. Topology module 216 may, for example, execute Intermediate System-to-Intermediate System with TE extensions (IS-IS-TE) or Open Shortest Path First with TE extensions (OSPF-TE) to receive TE information for advertised links. Such TE information includes one or more of the link state, administrative attributes, and metrics such as bandwidth available for use at various LSP priority levels of links connecting routers of the path computation domain. In some instances, topology module 216 executes BGP-TE to receive advertised TE information for inter-autonomous system and other out-of-network links Additional details regarding executing BGP to receive TE info are found in U.S. patent application Ser. No. 13/110,987, filed May 19, 2011 and entitled "DYNAMICALLY GENERATING APPLICATION-LAYER TRAFFIC OPTIMIZATION PROTOCOL MAPS," which is incorporated herein by reference in its entirety.

Topology database 210, e.g., a traffic engineering database (TED), stores topology information, received by topology module 216, for a network that constitutes a path computation domain for controller 200 to a computer-readable storage medium (not shown). Topology database 210 may include one or more link-state databases (LSDBs), where link and node data is received in routing protocol advertisements, received from a topology server, and/or discovered by link-layer entities such as an overlay controller and then provided to topology module 216. In some instances, an operator may configure traffic engineering or other topology information within topology database 210 via a client interface.

Based on the obtained topology information of topology database 210, path computation module (PCM) 212 may, in some examples, compute forwarding information for transport data channels (as one example, LSPs). In one example implementation, PCM 212 handles topology computation for a network or sub-network and programs forwarding information into the network devices by way of path provisioning module 216. Like topology module 216, path provisioning module 216 may in some examples communicate with network devices via network interface 220 to configure data planes of devices in the managed network.

For example, path provisioning module 216 may include a forwarding information base (FIB) configuration module (not shown) that programs forwarding information to data planes of nodes of the path computation domain. The FIB configuration module may implement, for instance, a software-defined networking (SDN) protocol such as the OpenFlow protocol to provide and direct the nodes to install forwarding information to their respective data planes. Accordingly, the "FIB" may refer to forwarding tables in the form of, for instance, one or more OpenFlow flow tables each comprising one or more flow table entries that specify handling of matching packets. FIB configuration module may in addition, or alternatively, implement other interface types, such as a Simple Network Management Protocol (SNMP) interface, path computation element protocol (PCEP) interface, a Device Management Interface (DMI), a CLI, Interface to the Routing System (IRS), NETCONF, or any other node configuration interface. Path provisioning module 218 may establish communication sessions with nodes 62 to install forwarding information to receive path setup event information, such as confirmation that received forwarding information has been successfully installed or that received forwarding information cannot be installed (indicating FIB configuration failure). Additional details regarding PCEP may be found in J. Medved et al., U.S. patent application Ser. No. 13/324,861, "PATH COMPUTATION ELEMENT COMMUNICATION PROTOCOL (PCEP) EXTENSIONS FOR STATEFUL LABEL SWITCHED PATH MANAGEMENT," filed Dec. 13, 2011, and in "Path Computation Element (PCE) Communication Protocol (PCEP)," Network Working Group, Request for Comment 5440, March 2009, the entire contents of each of which being incorporated by reference herein. Additional details regarding IRS are found in "Interface to the Routing System Framework," Network Working Group, Internet-draft, Jul. 30, 21012, which is incorporated by reference as if fully set forth herein.

Upon computing paths, PCM 212 may schedule the paths for provisioning by path provisioning module 216. A computed path includes path information usable by path provisioning module 216 to establish the path in the network. Provisioning a path may require path validation prior to committing the path to provide for packet transport.

In some examples, control unit 202 may include other modules (not shown) for performing other control functions, such as analytics on traffic, fault detection and path re-routing, and congestion management, for example.

Control unit 202 also includes timing synchronization module 208. As described herein, timing synchronization module 208 can determine, based on the obtained topology information of topology database 210, which individual ports of each of nodes 62 that participate in a timing flow should have master, slave, or passive designations for time synchronization. Controller 200 sends messages some or all of nodes 62 configuring each of the nodes with the master/slave/passive port designations. For example, controller 200 may send messages via respective source routed tunnels or other control channels between controller 200 and each of nodes 62B-62F. In this manner, the controller 200 can assign the port roles for all the devices in the network generally at the same time, without waiting for an algorithm to proceed through the network, device by device.

In some examples, controller 200 computes primary and alternate paths for timing distribution, based on topology database 210. Controller 200 can initially configure nodes 62 with the port assignments for the primary timing distribution path. Then, if controller 200 determines based on topology database 210 that the primary path has been disrupted (e.g., due to the primary path becoming congested, having high jitter, or network event such as node or link failures), controller 200 can simply reconfigure the port designations on a few ports of the nodes as needed, based on the computed alternate timing distribution path, to resume the timing distribution to the nodes 62 on the alternate path.

In accordance with the techniques of this disclosure, when each of nodes 62 receives the port role assignments from controller 200, this can trigger the nodes to use a time synchronization protocol (e.g., PTPv2) to exchange messages to obtain timestamp information from neighboring network devices. The nodes can then send messages to controller 200 specifying the timestamp information obtained by the exchange of time synchronization protocol messages. Controller 200 receives respective messages from the respective ones of nodes 62 via respective source routed tunnels or other control channels, and timing synchronization module 208 stores the timestamp information from the messages to timestamp data 228. Timing synchronization module 208 computes the offsets for the device clocks based on the received timestamp information. Timing synchronization module 208 may store the computed offsets to computed offsets 226. Timing synchronization module 208 can perform the offset computation for all nodes from which it receives the timestamp information, and in some examples the offset computations can all occur within a relatively short window of time. Controller 200 sends a message with the respective computed offset to each of the nodes 62 from which a timestamp message was received. Having the controller 200 centrally perform the offset computations for all of nodes 62 and program each of the nodes at once can be more efficient than having to wait for the time synchronization offset computations to propagate sequentially throughout the network. In this manner, the time clocks of all of nodes 62 throughout network 52 can be synchronized more quickly, e.g., in a matter of minutes rather than hours.

Figure 3:
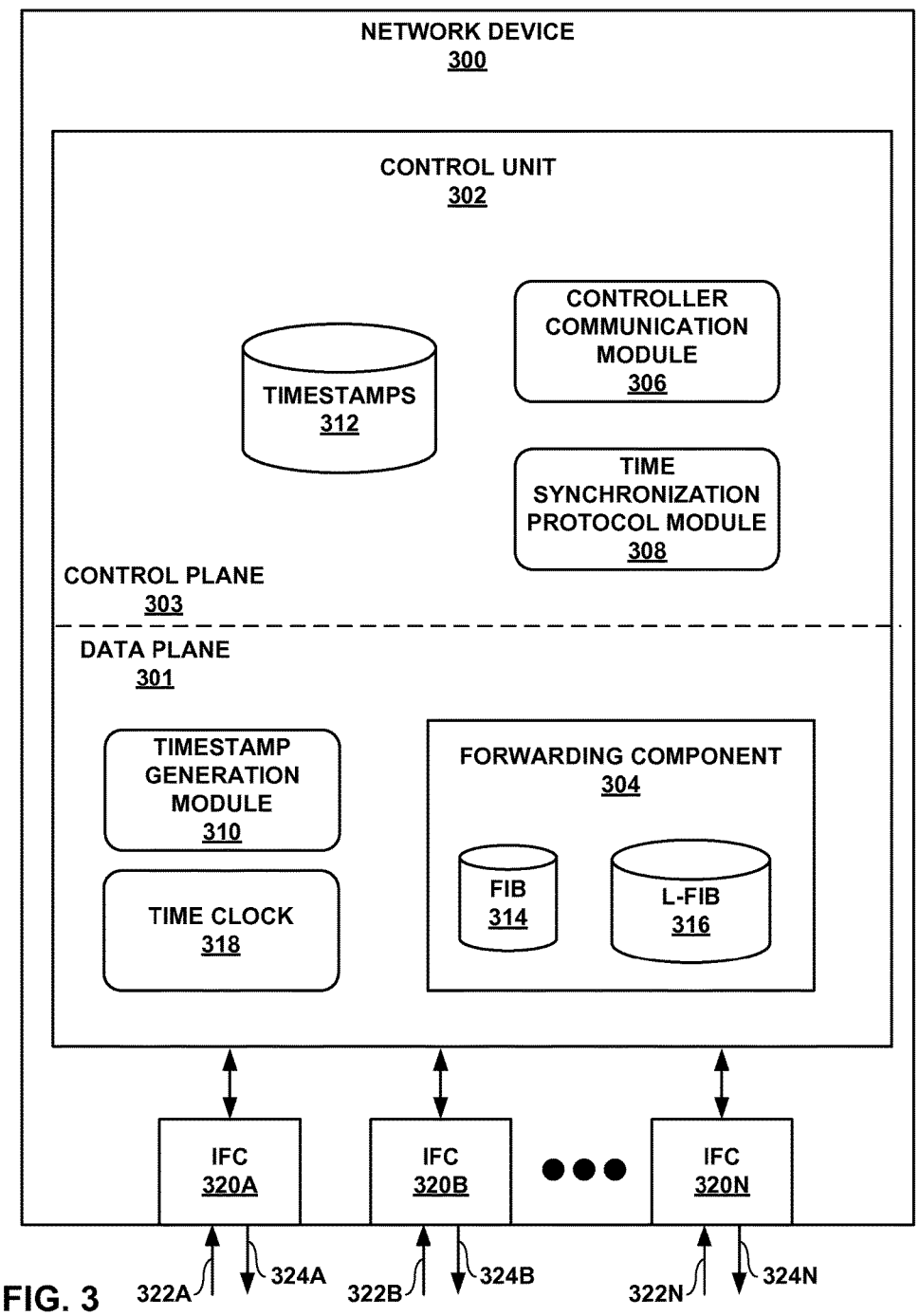
FIG. 3 is a block diagram illustrating an example embodiment of a network device in accordance with the techniques of this disclosure.

FIG. 3 is a block diagram illustrating an example network device in accordance with the techniques of this disclosure. Network device 300 may, for example, represent any of nodes 62 of FIG. 1A. As one example, network device 300 may be an access node that operates at the borders of the network and, responsive to receiving provisioning messages from the controller, applies network services including policy provisioning, policing and network connectivity to the network packets received from the subscriber devices. Network device 300 may reside at a border of an aggregation network, and operate as an endpoint for LSPs to map subscriber traffic into and out of the LSPs.

In the example of FIG. 3, network device 300 includes a control unit 302 that comprises data plane 301 and control plane 303. Data plane 301 includes forwarding component 304. In addition, network device 300 includes a set of interface cards (IFCs) 320A-320N (collectively, "IFCs 320") for communicating packets via inbound links 322A-322N (collectively, "inbound links 322") and outbound links 324A-324N (collectively, "outbound links 324"). Network device 300 may also include a switch fabric (not shown) that couples IFCs 320 and forwarding component 304.

Network device 300 executes a time synchronization protocol module 308 to exchange messages with other network devices in accordance with a time synchronization protocol, such as PTPv2 or other time synchronization protocol, for example. In the example of FIG. 3, network device 300 executes a controller communication module 306 that allows network device 300 to communicate with a network controller. In some examples, controller communication module 306 operates in accordance with a cloud control protocol which performs topology discovery. In some examples, network device 300 executes controller communication module 306 without executing an Interior Gateway Protocol (IGP) within control plane 303 of network device 300.

The centralized controller computes the topology information for the network and may compute forwarding information for one or more transport data channels, e.g., label switched paths (LSPs) based on the discovered topology. Network device 300 receives, from the controller and via the respective control channel, the pre-computed forwarding information computed by the centralized controller for configuring forwarding component 304 of network device 300 to forward the network packets on the LSPs. The pre-computed forwarding information may include directed FIB state including one or more MPLS labels for network device 300 to use for sending packets on an LSP. Network device 300 stores the forwarding information for the LSPs and any backup LSPs to L-FIB 316 and/or FIB 314. Based on forwarding information base (FIB) 314 and labeled FIB (L-FIB) 316, forwarding component 304 forwards packets received from inbound links 322 to outbound links 324 that correspond to next hops associated with destinations of the packets.

In this manner, in some examples network device 300 has a reduced control plane 303 that does not execute a Multi-protocol Label Switching (MPLS) protocol for allocation and distribution of labels for the LSPs and does not execute a routing protocol such as an interior gateway protocol (IGP). Instead, in these examples network device 300 executes the controller communication module 306 to receive MPLS forwarding information directly from a central controller, without requiring conventional MPLS signaling using a label distribution protocol such as LDP or RSVP. The centralized controller network device can provide a centralized, cloud-based control plane to configure the plurality of network devices to effectively operate as an MPLS switching fabric to provide transport LSPs between the edge nodes and the access nodes for transport of subscriber traffic. In various examples, the messages exchanged between controller communication module 306 of network device 300 and the centralized controller may conform to any of the message formats described in U.S. Pat. No. 8,693,374, entitled CENTRALIZED CONTROL OF AN AGGREGATION NETWORK WITH A REDUCED CONTROL PLANE, issued Apr. 8, 2014.

In some examples, forwarding component 304 may comprise one or more dedicated processors, hardware, and/or computer-readable media storing instructions to perform the techniques described herein.

In accordance with the techniques of this disclosure, controller communication module 306 receives a message from the controller (e.g., controller 54A of FIG. 1) that specifies port timing flow role assignments according to a time synchronization protocol (e.g., PTPv2 or other time synchronization protocol). The controller selected the port timing flow assignments based on the controller's global view of the network in which network device 300 is positioned. In response to receiving the message specifying the port role assignments, time synchronization protocol module 308 configures ports of network device 300 based on the roles specified in the message from the controller. For example, according to the role assignments specified by the message received from the controller, network device 300 may configure a first port as a master port and a second port as a passive port, and a third port as a slave port (or any variation on one or more of master, slave, passive). Notably, network device 300 need not assign the ports by a process of dynamic negotiation with other network devices (e.g., using a Best Master Clock Algorithm (BMCA)), but rather receives the port role assignments from the controller that performed a central port determination for all devices in the network timing flow based on the controller's global view of the network topology. In this manner, the controller can assign the port roles for all the devices in the network generally at the same time, without waiting for an algorithm to proceed through the network, device by device.

In response to receiving the message from the controller with the port timing role assignments and assigning the port roles based on the message, time synchronization protocol module 308 is triggered to begin exchanging time synchronization protocol messages with one or more neighboring network devices. For example, where network device 300 has one or more ports designated as master ports for the timing flow, time synchronization protocol module 308 may send a message (per master port) that initiates an exchange of time synchronization protocol messages. In the example of the time synchronization protocol being PTPv2, for example, and for master ports, time synchronization protocol module 308 may send a SYNC message, followed by a FOLLOW_UP message containing a timestamp indicating the time at which network device 300 sent the earlier SYNC message. Time synchronization protocol module 308 may receive a DELAY_REQ message and send a DELAY_RESP message. Further details on the PTPv2 messages exchanged between master/slave ports on network devices are described below with respect to FIG. 4. Timestamp generation module 310 may be located in data plane 301, and generates timestamps based on a current time indicated by time clock 318. In some examples, timestamp generation module 310 inserts the timestamp value(s) in the time synchronization protocol messages as they are being output at the data plane 301. Timestamp generation module 310 may operate in hardware or in software to insert the timestamp values. Time synchronization protocol module 308 can store the timestamp value(s) collected via the exchanged messages to timestamps 312. Time synchronization protocol module 308 may participate in exchange of PTPv2 messages on multiple ports, including ports having a master role and ports having a slave role.

In the example of FIG. 3, timestamp generation module 310 is located in data plane 301, e.g., in either an interface portion of data plane 301 or in a Field Programmable Gate Arrays (FPGA), for example. Timestamp generation module 310 may operate in hardware or in software. Although illustrated for purposes of example with timestamp generation module 310 being located in data plane 301, in some examples, timestamp generation module 310 could alternatively be located in control plane 303 of network device 300.

In accordance with the techniques of this disclosure, after time synchronization protocol module 308 has obtained all of the timestamp data needed to determine the offset for time clock 318 relative to a master device (network device 300 having stored the timestamp data at timestamps 312, for example), time synchronization protocol module 308 sends a message to the network controller (e.g., controller 54A, FIG. 1) that includes the collected timestamps. The controller computes the offset based on the timestamp data. Time synchronization protocol module 308 of network device does not itself compute the offset, but instead relies on controller to perform the offset computation.

Controller communication module 306 subsequently receives a message from the controller (e.g., controller 54A of FIG. 1) that specifies a time offset computed by the controller for network device 300 based on the timestamp information that network device 300 previously sent to the controller. The time offset will typically be an adjustment needed to synchronize the local time of network device 300 relative to the grand master clock. Controller communication module 306 may pass the time offset to time synchronization protocol module 308, and time synchronization protocol module 308 can adjust time clock 318 based on the time offset.

The architecture of network device 300 illustrated in FIG. 3 is shown for example purposes only. In other embodiments, network device 300 may be configured in a variety of ways. In one embodiment, for example, control unit 302 and its corresponding functionality may be distributed within IFCs 320.

Control unit 302 may be implemented solely in software, or hardware, or may be implemented as a combination of software, hardware, or firmware. For example, control unit 302 may include one or more processors which execute software instructions. In that case, the various software modules of control unit 302 may comprise executable instructions stored on a computer-readable medium, such as computer memory or hard disk.

Figure 4:
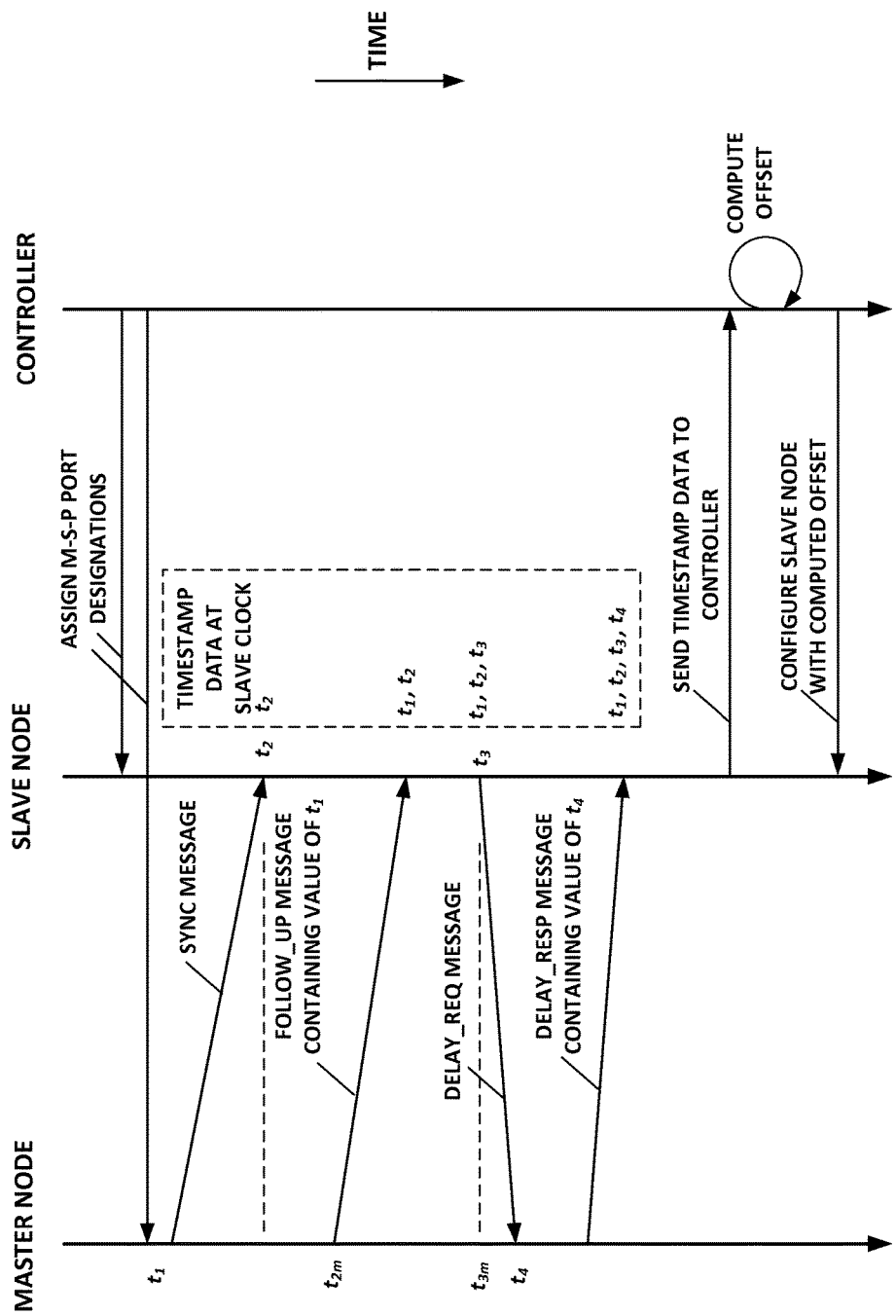
FIG. 4 is a timing diagram illustrating example operation of network devices in accordance with the techniques of this disclosure.

FIG. 4 is a timing diagram illustrating example operation of network devices in accordance with the techniques of this disclosure. FIG. 4 is described for purposes example with respect to PTPv2 as the time synchronization protocol, but other time synchronization protocols may be used consistent with the techniques of this disclosure. The controller and nodes in FIG. 4 may be, as one example, controller 54A and nodes 62A, 62B of FIGS. 1A-1C. In the example of FIG. 4, the controller sends messages to the nodes assigning the master-slave-passive port designations. In response to receiving the port designation messages from the controller, the node having the master port ("master node") outputs a SYNC message to the node having the slave port ("slave node"). Arrival of the SYNC message at the slave node gives timestamp $t_2$. In some examples, the SYNC message could also carry timestamp $t_1$. The Master node may subsequently output a FOLLOW_UP message, the arrival of which at the slave node gives timestamp $t_1$. The slave node then outputs a DELAY_REQ message. The slave node notes the sending time from the slave node as timestamp $t_3$. The master node responds with a DELAY_RESP message, which carries timestamp $t_4$, the arrival time of corresponding DELAY_REQ message.

Upon arrival of the DELAY_REQ message, the slave node has all four timestamps needed for the clock offset determination relative to the master node, i.e., timestamps $t_1$, $t_2$, $t_3$ and $t_4$. The slave node sends a message to controller 54A that includes the four timestamps. Based on the four timestamps, controller 54A can compute the offset of the Slave Clock from the Master, such as by Equation (1):

$$\text{offset} = \frac{1}{2}\{(t_2 - t_1) - (t_4 - t_3)\} \qquad (1)$$

Where the master node is not the grand master clock node, the controller can compute the offset for the slave node relative to the grand master clock node based on other offset(s) computed for other slave nodes one hop away from the grand master clock node. The controller then configures the slave node with computed offset. In some examples, controller may repeat this process periodically, with the overall accuracy of time synchronization within the network improving each time the process completes.

Figure 5:
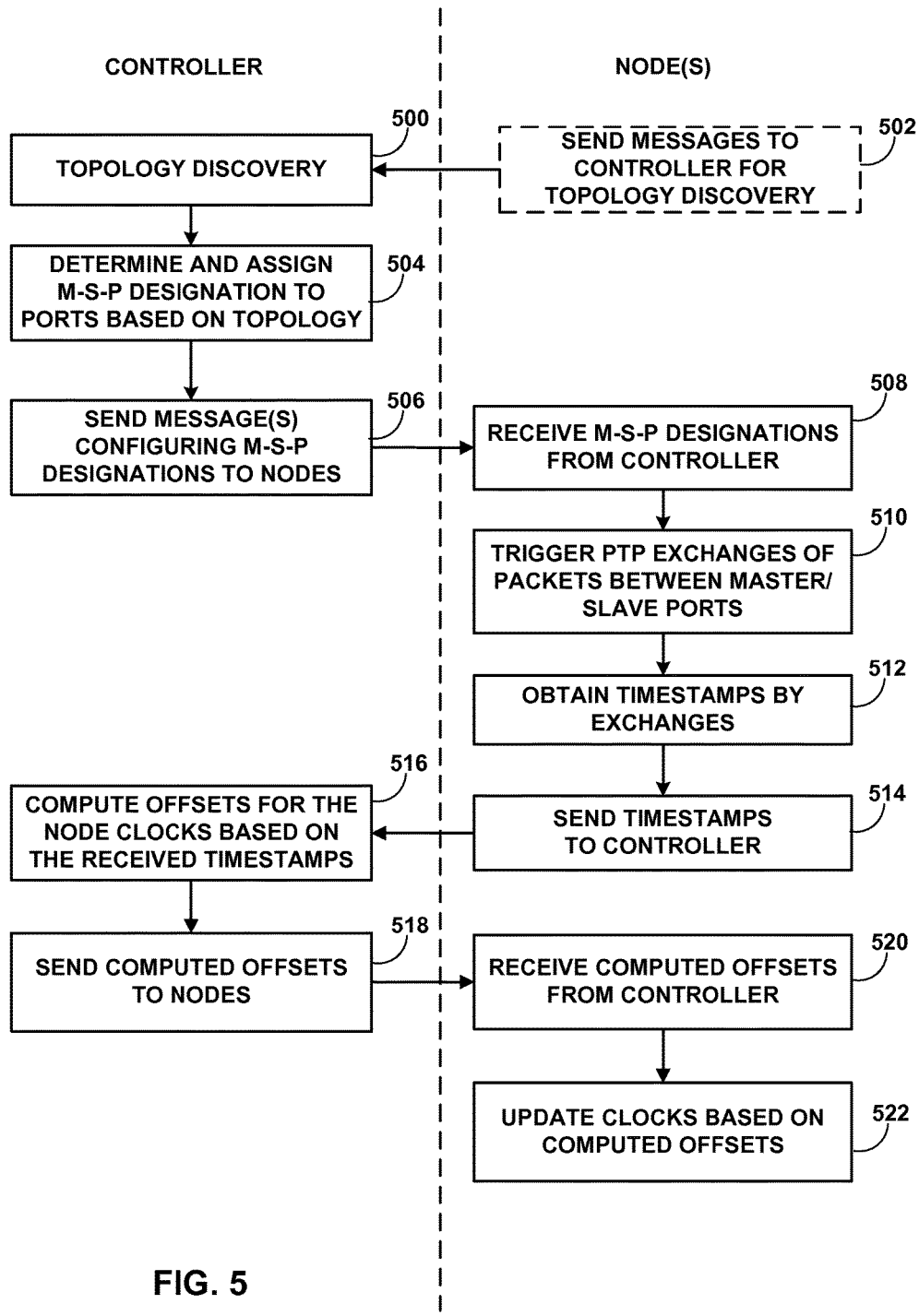
FIG. 5 is a flowchart illustrating example operation of network devices in accordance with the techniques of this disclosure.

FIG. 5 is a flowchart illustrating example operation of network devices in accordance with the techniques of this disclosure. FIG. 5 is described for purposes of example with respect to FIGS. 1A-1C, 2 and 3.

Controller 54A obtains information about the topology of network 52, and topology module 216 of controller 54A can store topology information to topology database 210 (500). The topology information may indicate states of various nodes, interfaces, and/or links in network 52, and how these network components are connected to one another. In some examples, nodes 62 may send messages to controller 54A, by which controller 54A learns topology information (502). For example, controller 54A may obtain at least some of the topology information from one or more of the plurality of nodes 62 by executing one of a software defined networking (SDN) protocol or an interior routing protocol to receive the topology information from the nodes 62 or from a topology database. A time synchronization module 208 of controller 54A determines timing flow roles for one or more ports of some or all of nodes 62 based on the stored topology information for the network, e.g., topology database 210 (504). Controller 54A sends the messages to one or more of nodes 62, wherein the message specifies settings information to assign the determined timing flow role to one or more ports of the network device to which the message is being sent (506). Controller 54A may send the messages via a control channel to the respective nodes, for example. Controller 54A may send such messages to all of nodes 62, in some examples. In some examples, controller 200 computes both primary and alternate paths for timing distribution based on topology database 210, and the messages sent to the nodes specify timing roles for the primary paths.

One or more of the nodes 62 receives the message from controller 54A, wherein the message specifies settings information to assign a timing flow role to one or more ports of the network device (508). For example, the timing flow roles may be master, slave, or passive timing flow role designations. In response to receiving the respective control channel message from controller 54A, the node sets its port assignments to have the respective timing flow roles according to the settings information received from controller 54A. For example, time synchronization protocol module 308 of the node configures ports of network device 300 based on the roles specified in the message from the controller.

Also in response to receiving the message from the controller with the port timing role assignments and assigning the port roles based on the message, time synchronization protocol module 308 of the node is triggered to begin exchanging time synchronization protocol messages (e.g., PTPv2 messages) with one or more neighboring network devices (510). By this exchange of time synchronization protocol messages, the nodes 62 obtain timestamps needed for an offset calculation (512). After the node 62 has all the timestamps needed for the offset calculation, the node 62 sends the timestamps to controller 54A (514), e.g., via a control channel previously established between the node and controller 54A. Many or all of nodes 62 in network can be triggered in this way to exchange time synchronization protocol messages and send the collected timestamps to controller 54A.

Controller 54A receives the messages with the timestamp information from the nodes 62, and timing synchronization module 208 computes the offset based on the timestamp information (516). Timing synchronization module 208 can perform the offset computation for all nodes from which it receives the timestamp information, and in some examples the offset computations can all occur within a relatively short window of time. The Controller 54A sends a message with the respective computed offset to each of the nodes from which a timestamp message was received (518). The node 62 receives the computed offsets from the controller (520). In some examples, controller communication module 306 of the node 62 may pass the time offset to time synchronization protocol module 308, and time synchronization protocol module 308 can adjust time clock 318 based on the time offset (522).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
   determining, by a network controller that manages a network of a plurality of network devices, timing flow roles for one or more ports of each of the plurality of network devices based on topology information for the network, wherein the timing flow roles indicate an orientation of the ports relative to a grand master clock in a timing flow associated with a time synchronization protocol;
   outputting, by the network controller, a plurality of messages to one or more of the plurality of network devices, wherein each of the plurality of messages specifies settings information to assign the determined timing flow roles to one or more ports of the respective network device of the plurality of network devices;
   receiving, by the network controller and from each of the plurality of network devices, timestamp information obtained by the plurality of network devices exchanging time synchronization protocol messages with one another according to a time synchronization protocol;
   determining, by the network controller and based on the received timestamp information, a respective clock offset relative to a reference time of the grand master clock for each of the plurality of network devices; and
   outputting, by the network controller, the respective clock offsets to update a respective timing clock maintained by each of the plurality of network devices.

2. The method of claim 1, further comprising:
   receiving, by the network controller, at least some of the topology information by at least one of:
      receiving the topology information from a topology database external to the network controller,
      receiving one or more of the plurality of network devices by executing one of a software defined networking (SDN) protocol, or
      receiving an interior routing protocol to receive the topology information from the one or more of the plurality of network devices.

3. The method of claim 1, wherein outputting the settings information and outputting the respective clock offsets comprises outputting a plurality of control protocol messages to one or more of the plurality of network devices.

4. The method of claim 1, wherein the timing flow roles comprise one or more of a master port downstream to the grand master clock in the timing flow and upstream of a slave port, the slave port downstream to the grand master clock in the timing flow and downstream to a master port, and a passive port that does not participate in the timing flow.

5. The method of claim 1, wherein the time synchronization protocol comprises at least a portion of a Precision Time Protocol Version Two (PTPv2).

6. The method of claim 1, wherein determining the timing flow roles comprises determining the timing flow roles as a primary set of timing flow roles for a primary timing distribution path, and determining a secondary set of timing flow roles for a secondary timing distribution path,
wherein outputting the plurality of messages comprises outputting a plurality of messages that specify settings information to assign the primary set of timing flow roles, the method further comprising:
storing, by the network controller, the secondary set of timing flow roles.

7. The method of claim 6, further comprising:
in response to determining, based on the topology information, that the primary timing distribution path is disrupted, outputting one or more messages to one or more of the plurality of network devices specifying settings information to assign the secondary set of timing flow roles to one or more ports of the one or more network devices.

8. The method of claim 1, further comprising:
maintaining, by the network controller, a generation number that indicates a time clock value generation;
incrementing the generation number after completing a round of clock offset computation,
wherein outputting the respective clock offsets comprises outputting respective messages that each include the respective clock offsets and the generation number,
wherein receiving the timestamp information comprises receiving, from each of the plurality of network devices, a respective message specifying the timestamp information and the generation number; and
determining, based on the generation number in the received messages, whether to use the received timestamp information for clock offset computation.

9. The method of claim 1, wherein determining the respective clock offset comprises excluding from a clock offset computation any received timestamp information having time variations greater than a threshold amount of variation.

10. The method of claim 1, wherein the network comprises a frequency-assisted timing network, wherein determining the timing flow roles comprises determining common timing flow roles for (i) a first time synchronization protocol for determining a timing frequency and (ii) a second time synchronization protocol for determining a timing phase.

11. The method of claim 10, wherein the first time synchronization protocol for determining the timing frequency conforms to at least a portion of Synchronous Ethernet standard, and wherein the second time synchronization protocol for determining the timing phase comprises at least a portion of a Precision Time Protocol Version Two (PTPv2).

12. The method of claim 1, further comprising periodically repeating, by the network controller, the respective steps of determining, outputting, receiving, determining, and outputting.

13. The method of claim 1, further comprising in response to determining, by the network controller, that a clock drift indicated by the respective clock offset for one of the plurality of network devices exceeds a threshold value: repeating, by the network controller, the respective steps of determining, outputting, receiving, determining, and outputting.

14. The method of claim 1, wherein receiving the timestamp information comprises receiving first timestamp information, the method further comprising:
receiving second timestamp information obtained by the plurality of network devices exchanging a second set of time synchronization protocol messages with one another according to a time synchronization protocol;
determining, based on the second timestamp information, a respective second clock offset relative to the reference time of the grand master clock for each of the plurality of network devices;
in response to determining that the respective second clock offset is greater than a threshold value, outputting the respective second clock offsets; and
in response to determining that the respective second clock offset is not greater than the threshold value, refraining from outputting the respective second clock offset.

15. The method of claim 1, further comprising identifying one or more network devices of the network that are non-participating nodes that are not configured to output timestamp information obtained by the plurality of network devices exchanging time synchronization protocol messages with one another according to a time synchronization protocol, and labeling the port configuration on the non-participating nodes.

16. The method of claim 1, wherein the network controller comprises a first network controller, the method further comprising:
sending the topology information, timing flow roles, and determined clock offsets from the first network controller to a second network controller serving as a redundant backup controller to the first network controller.

17. A controller that manages a network of a plurality of network devices, the controller comprising:
one or more databases configured to store topology information for the network;
a time synchronization module configured to determine timing flow roles for one or more ports of each of the plurality of network devices based on the topology information for the network;
one or more network device protocol interfaces, wherein each of the network device protocol interfaces is configured to output a plurality of messages to one or more of the plurality of network devices, wherein each of the plurality of messages specifies settings information to assign the determined timing flow roles to one or more ports of the respective network device of the plurality of network devices,
wherein the one or more network device protocol interfaces is configured to receive from each of the plurality of network devices, timestamp information obtained by the plurality of network devices exchanging time synchronization protocol messages with one another, wherein the time synchronization module is configured to determine, based on the timestamp information, a respective clock offset for each of the plurality of network devices, and wherein the one or more network device protocol interfaces is configured to output the respective clock offsets to update a respective timing clock of each of the plurality of network devices.

18. The controller of claim 17, further comprising a topology module that receives the topology information by at least one of:

receiving the topology information from a topology database external to the controller, executing a software defined networking (SDN) protocol to receive the topology information from one or more of the plurality of network devices, or executing an interior routing protocol to receive the topology information from one or more of the plurality of network devices.

19. The controller of claim 17, wherein the controller comprises a first network controller, and wherein the first network controller is configured to send the topology information, timing flow roles and determined clock offsets to a second network controller serving as a redundant backup controller to the first network controller.

20. A system comprising:

a plurality of network devices; and a network controller that manages a network that includes the plurality of network devices, the network controller comprising:

one or more databases configured to store topology information for the network;

a time synchronization module configured to determine timing flow roles for one or more ports of each of the plurality of network devices based on the topology information for the network wherein the timing flow roles indicate an orientation of the ports relative to a grand master clock in a timing flow associated with a time synchronization protocol; and one or more network device protocol interfaces, wherein each of the network device protocol interfaces is configured to output a plurality of messages to the plurality of network devices, wherein each of the plurality of messages specifies settings information to assign the determined timing flow roles to one or more ports of the respective network device of the plurality of network devices, wherein a network device of the plurality of network devices comprises:

an interface configured to receive, from the network controller, a message that specifies settings information to assign timing flow roles to one or more ports of the network device, wherein the timing flow roles indicate an orientation of the ports relative to a grand master clock in a timing flow associated with a time synchronization protocol; and a time synchronization protocol module configured to set the ports with respective timing flow roles according to the settings information, and, responsive to receiving the message and by the network device, exchange time synchronization protocol messages with one or more neighboring network devices to obtain timestamp information, wherein the time synchronization protocol module is configured to send, to the network controller, the timestamp information obtained by exchanging the time synchronization protocol messages, wherein the time synchronization module of the network controller is configured to determine, based on the timestamp information, a respective clock offset for each of the plurality of network devices, and wherein the one or more network device protocol interfaces is configured to output the respective clock offsets to update a respective timing clock of each of the plurality of network devices.

21. The system of claim 20, wherein the network controller comprises a first network controller, the system further comprising a second network controller serving as a redundant backup controller to the first network controller, wherein the second network controller receives and stores the topology information, timing flow roles, and determined clock offsets from the first network controller.

22. The system of claim 20, wherein the network controller is configured to determine the timing flow roles as a primary set of timing flow roles for a primary timing distribution path, and determines a secondary set of timing flow roles for a secondary timing distribution path, wherein the plurality of messages output to the plurality of network devices each specifies settings information to assign the primary set of timing roles, and wherein the controller is configured to store the secondary set of timing flow roles.

23. The system of claim 22, wherein the controller is configured to, in response to determining, based on the topology information, that the primary timing distribution path is disrupted, output one or more messages to one or more of the plurality of network devices specifying settings information to assign the secondary set of timing flow roles to one or more ports of the one or more network devices.

24. A method comprising:

determining, by a network controller that manages a frequency-assisted timing network of a plurality of network devices, timing flow roles for one or more ports of each of the plurality of network devices based on topology information for the network, wherein the timing flow roles indicate an orientation of the ports relative to a grand master clock in a timing flow associated with a time synchronization protocol, wherein determining the timing flow roles comprises determining common timing flow roles for (i) a first time synchronization control protocol for determining a timing frequency and (ii) a second time synchronization control protocol for determining a timing phase;

outputting, by the network controller, a plurality of messages to one or more of the plurality of network devices, wherein each of the plurality of messages specifies settings information to assign the determined timing flow roles to one or more ports of the respective network device of the plurality of network devices;

determining, by the network controller and based on timestamp information received from one of the plurality of network devices, a respective clock offset relative to a reference time of the grand master clock for each of the plurality of network devices; and outputting, by the network controller, the respective clock offsets to update a respective timing clock maintained by each of the plurality of network devices.

25. The method of claim 24, wherein each of the plurality of network devices operates without executing in its respective control plane the first time synchronization control protocol for determining a timing frequency or the second time synchronization control protocol for determining a timing phase.

26. The method of claim 25, wherein the first time synchronization control protocol comprises Ethernet Synchronization Messaging Channel (ESMC) and wherein the second time synchronization control protocol comprises Best Master Clock Algorithm (BMCA).

27. The method of claim 24, further comprising:
receiving, by the network controller, at least some of the topology information from:
a topology database external to the network controller, or from one or more of the plurality of network devices by executing one of a software defined networking (SDN) protocol or an interior routing protocol to receive the topology information from the one or more of the plurality of network devices.

28. The method of claim 24, wherein the timing flow roles comprise one or more of a master port downstream to the grand master clock in the timing flow and upstream of a slave port, the slave port downstream to the grand master clock in the timing flow and downstream to a master port, and a passive port that does not participate in the timing flow.

29. The method of claim 24, further comprising:
maintaining, by the network controller, a generation number that indicates a time clock value generation;
incrementing the generation number after completing a round of clock offset computation,
wherein outputting the respective clock offsets comprises outputting respective messages that each include the respective clock offsets and the generation number; and
receiving, from each of the plurality of network devices, a respective message specifying the timestamp information and the generation number,
determining, based on the generation number in the received messages, whether to use the received timestamp information for clock offset computation.

30. The method of claim 24, wherein determining the respective clock offset comprises excluding from a clock offset computation any received timestamp information having time variations greater than a threshold amount of variation.

31. The method of claim 24, further comprising periodically repeating, by the network controller, the respective steps of determining, outputting, determining, and outputting.

32. The method of claim 24, further comprising in response to determining, by the network controller, that a clock drift indicated by the respective clock offset for one of the plurality of network devices exceeds a threshold value: repeating, by the network controller, the respective steps of determining, outputting, determining, and outputting.

33. The method of claim 24, wherein the network controller comprises a first network controller, the method further comprising:
sending the topology information, timing flow roles and determined clock offsets from the first network controller to a second network controller serving as a redundant backup controller to the first network controller.

* * * * *